United States Patent
Sugimoto

[15] 3,648,862
[45] Mar. 14, 1972

[54] GOODS TRANSFER DEVICE FOR MOTOR WAGON AND TRAILER VAN BASED ON VIBRATORY PRINCIPLE

[72] Inventor: Nobuo Sugimoto, Osaka-shi, Japan
[73] Assignee: Kishaseizo Kabushiki Kaisha
[22] Filed: July 3, 1969
[21] Appl. No.: 838,886

[52] U.S. Cl. ...................................214/83.3, 198/220 DB
[51] Int. Cl. ..................................................B60p 1/58
[58] Field of Search ...............................214/83.3; 198/220

[56] References Cited

UNITED STATES PATENTS

| | | | |
|---|---|---|---|
| 2,062,760 | 12/1936 | Overstrom | 198/220 |
| 2,500,293 | 3/1950 | O'Connor | 214/83.3 X |
| 2,674,381 | 4/1954 | Cady | 198/220 X |
| 2,863,578 | 12/1958 | Gaddis | 198/220 X |
| 3,119,503 | 1/1964 | Herpich et al. | 214/512 |
| 3,185,486 | 5/1965 | Haley | 214/83.3 X |
| 3,212,629 | 10/1965 | Maeder et al. | 198/220 |
| 3,485,401 | 12/1969 | Meyer | 214/83.3 X |
| 3,024,663 | 3/1962 | Carrier, Jr. et al. | 198/220 DB |
| 3,089,582 | 5/1963 | Musschoot et al. | 198/220 DB |

FOREIGN PATENTS OR APPLICATIONS

| | | | |
|---|---|---|---|
| 804,087 | 5/1951 | Germany | 214/83.3 |
| 737,174 | 9/1955 | Great Britain | 214/83.3 |

Primary Examiner—Albert J. Makay
Attorney—McGlew and Toren

[57] ABSTRACT

Goods transfer device for a motor wagon or trailer van which is characterized by providing on the body the motor wagon or trailer van an exciter capable of generating straight line movement for causing prescribed vibrations of the entire motor wagon or trailer van over traveling tires and suspension device, thus transferring goods in a truck body by vibration.

1 Claims, 19 Drawing Figures

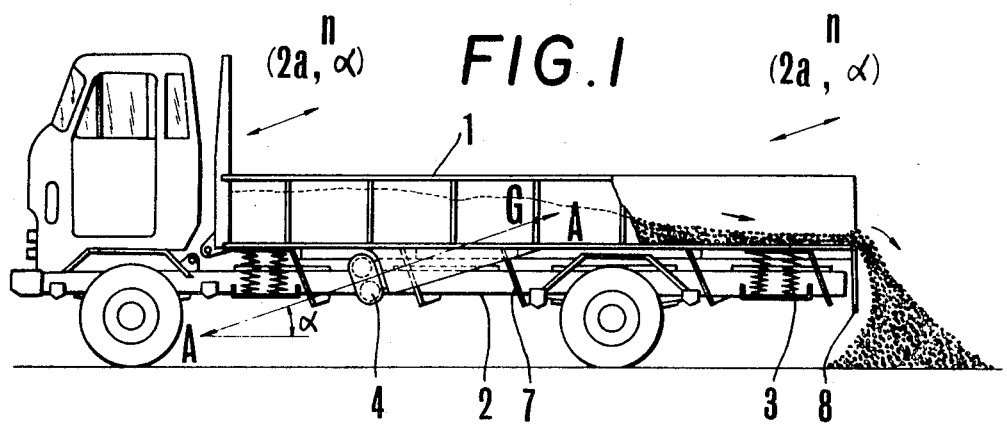
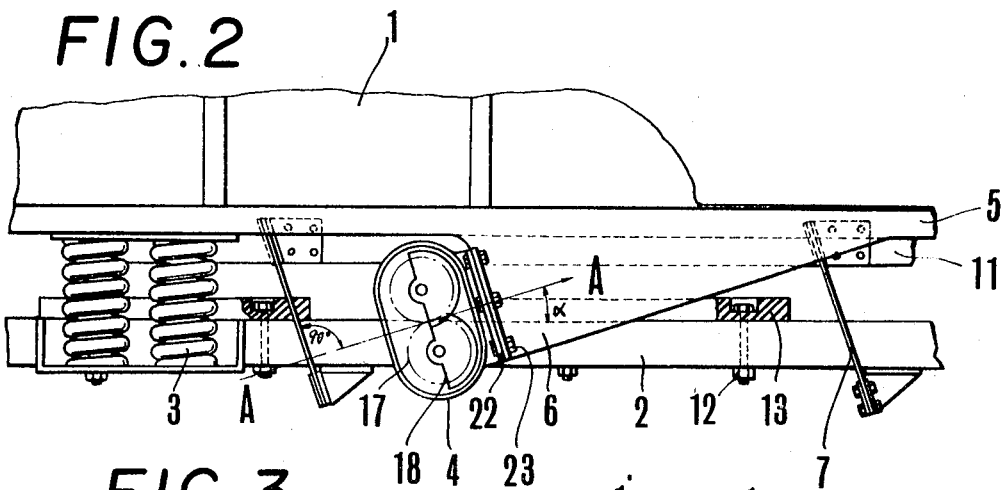
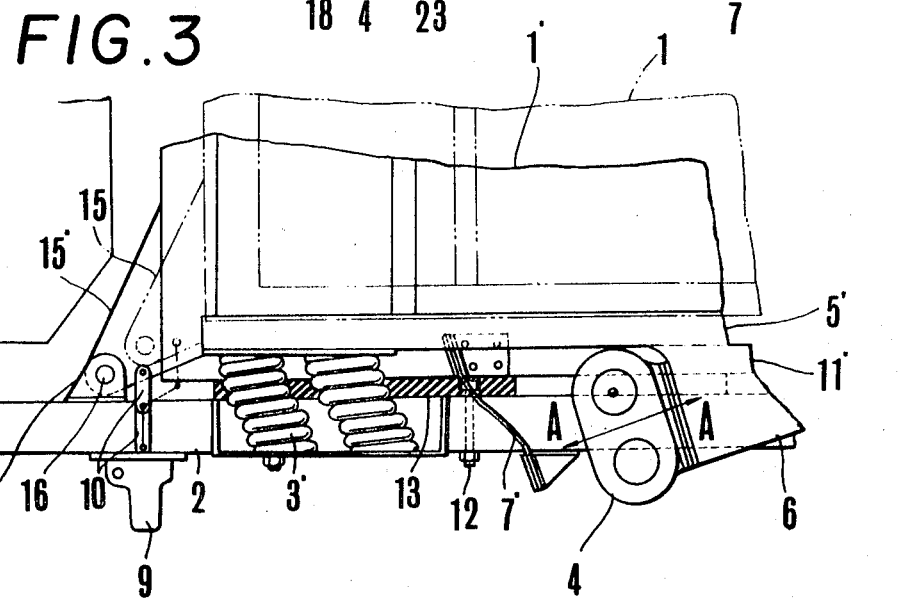
INVENTOR.
NOBUO SUGIMOTO

INVENTOR.
NOBUO SUGIMOTO

PATENTED MAR 14 1972 3,648,862

INVENTOR.
NOBUO SUGIMOTO
BY

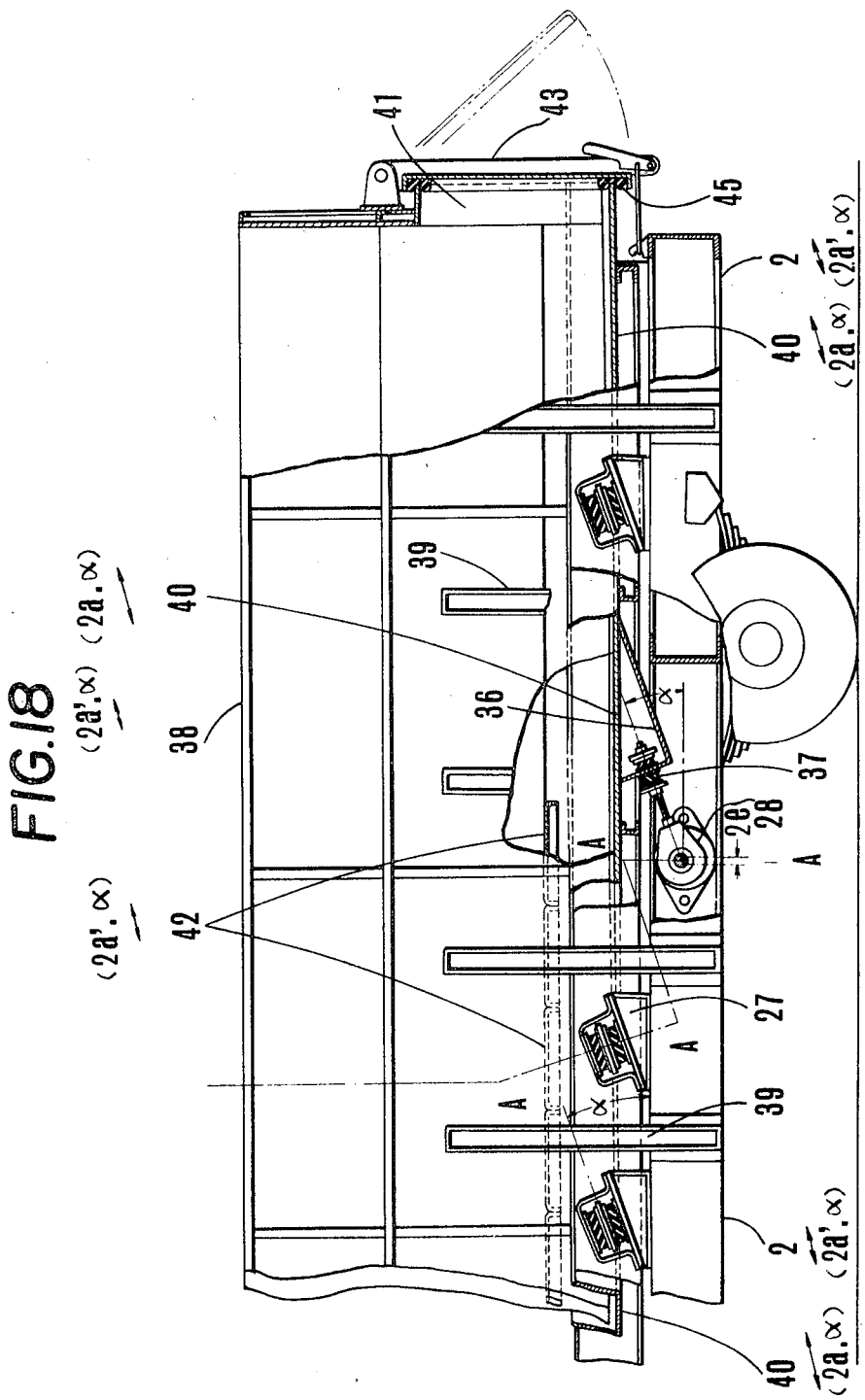

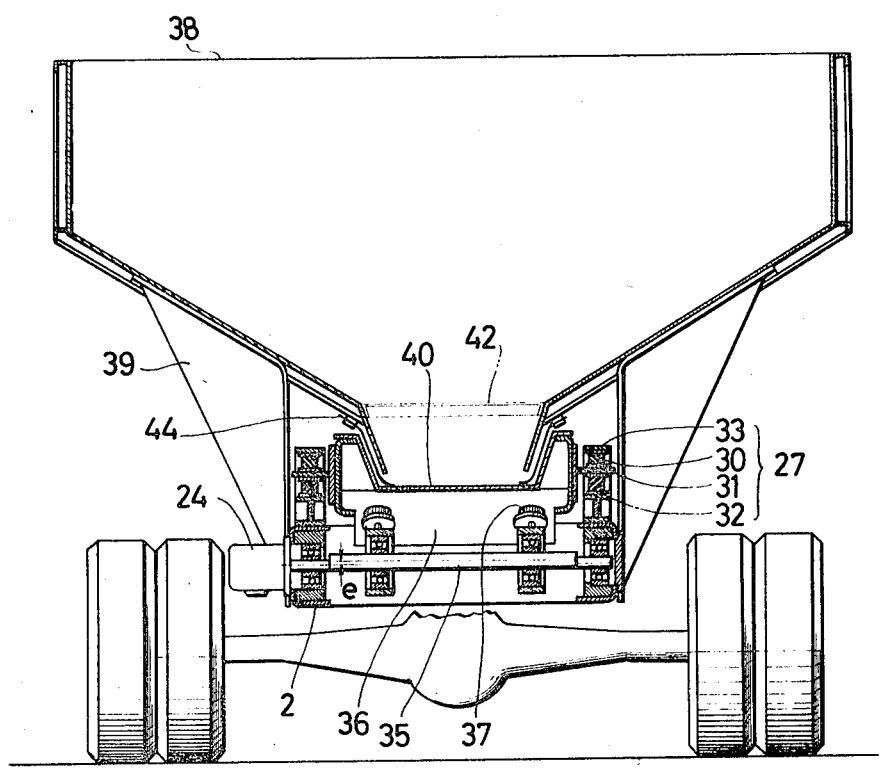

GOODS TRANSFER DEVICE FOR MOTOR WAGON AND TRAILER VAN BASED ON VIBRATORY PRINCIPLE

This invention relates to a device wherein the principle of conveying material based on the vibratory principle, which has recently made a remarkable advancement, is applied to the shifting of cargo on the truck body of a motor wagon or trailer van.

The chief purpose of this invention lies in saving man-power and time in unloading and loading operations of goods by shifting goods held on a truck body with vibration function, based on the principle and actual embodiments of vibration generating method in vibratory shifting and its machines, such as vibrating conveyor, vibrating feeder and vibrating screen (hereinafter called as a vibration machine or vibrating machines) which have already been widely used, in such manner that exciters publicly known in vibrating machines are attached to the body of vehicle which is elastically supported off over the ground by suspension spring including traveling tires, having the direction of its exciting force pass through the center of gravity of vehicle, thus giving the prescribed vibration (specified vibration) to the entire vehicle, or in such manner that a truck body itself is elastically supported preventing its lateral movement and allowing its parallel movement with the chassis, which is already elastically supported by traveling balloon tires and suspension springs, then exciters are assembled directly to the truck body or a crank mechanism is provided between the truck body and the chassis to give the prescribed vibration.

That is, in the case of unloading operation, gradual shifting of the goods contained at the interior or front portion of the truck body towards its back door is made by vibratory action in a straight lined and right-hand up direction, thus dropping the goods directly onto the ground or manually conducting the off-loading, and thereby automatically conducting the shifting of goods within the truck body.

Another object of this invention is to shift goods loaded onto a truck body from a back door immediately to the interior or front portion of truck body, thus reducing the amount of cargo-handling work within the truck body and at the same time making the succeeding cargo-loading work easier, by providing the device of this invention in such manner that the vibratory action in a straight lined and right-hand down direction is provided whereby the goods are shifted in the direction opposite to that in the unloading operation.

Next, explanations shall be made on details of the prescribed vibration given to the truck body or to the entire vehicle, and of the device to generate said vibration.

Generally speaking, in ordinary vibrating machines to transfer (convey) material (goods) by utilizing vibration, the fundamental vibration given to the trough in which the material is positioned consists of a straight line motion having certain direction of vibrating movement (which is defined by the angle $\alpha$, held between said direction and the horizontal plane and is called a project angle). The fundamental vibration is specified by such dimensions as total amplitude $2a$, frequency $n$, and project angle $\alpha$. The speed at which the material is transferred by the vibratory movement varies depending on the fundamental vibration.

In ordinary vibrating machines, $2a = 1$ to $25$ mm., $n = 400$ to $3,000$ cycle/min. and $\alpha = 15°$ to $45°$. And in the device of this invention the prescribed dimensions of vibration, which is given to the entire vehicle or truck body, fall under the above-mentioned range of figures. However, considering the unfavorable effect exerted to the loaded cargo and each part of the vehicle by vibratory acceleration, the difficulties experienced by people working in the vibrating truck body, and the unstable vibration caused by the insufficient rigidity of the truck body and/or chassis, the ranges of the dimensions of the prescribed vibration to be given to the truck body and the entire vehicle must be carefully selected. In this case the following ranges are desirous:

$2a = 3$ to $10$ mm.

$n = 500$ to $1,000$ cycle/min.

$\alpha = 15°$ to $30°$

Next, as a general principle, such vibration may be exerted as being done in an ordinary vibrating machine by one of the following two systems:

1. By giving the exciting force which is generated by an exciter through the rotation of unbalanced weight to the mass supported elastically by sufficiently soft spring with such frequency as being appreciably higher than the natural frequency which comes out incidentally within the vibration system consisting of said mass and spring to exert stable vibration. This system is called as unbalanced weight vibrating system. Next, as an alternative method, 2. a method called "two (2) mass, two (2) freedom resonance vibrating system", which is employed in a certain type of resonance vibrating conveyor, may be used. This is a vibrating system consisting of two masses which are connected elastically to each other with a very strong spring, and one of said two masses is supported off the ground with a soft spring, wherein said two masses are connected by a crank mechanism, and a periodic exciting force is given through the crank mechanism with such frequency as being close to the higher resonance frequency of said vibrating system, to exert stable vibration at a resonance condition.

In this case, the entire vehicle truck or trailer may be considered as being supported off the ground with soft elasticity by balloon traveling tires and suspension spring. Therefore, such prescribed vibration as mentioned above can be given to entire vehicle or trailer by firmly fixing an exciter, which exerts conventionally known straight line motion, at such position of vehicle body or its frame that, the exciting force passes through approximately the center of gravity of entire vehicle and by driving the exciter by a motor with such frequency as appreciably higher than natural frequency of the vibration system consisting of the mass of the vehicle body—balloon traveling tire and suspension spring.

However, in an ordinary truck, it is not necessarily desirous to give vibration to the entire vehicle which includes a truck body. That is, as the body or frame of an ordinary truck is not so designed as to have very high strength, the insufficiency of rigidity or strength against the prescribed vibration may cause undesirous results. Therefore, it will be practical in these cases to further support elastically the truck body only with spring over the chassis, and to attach an exciter directly to the truck body so that the truck body only is subjected to the prescribed vibration on the chassis. Thus the explanations to follow will be made on two separate cases, that is when only truck body is subjected to vibration and when the prescribed vibration may be given to entire vehicle as in the case of covered wagon trailer, the body of which has comparatively large rigidity and strength.

On the other hand when the resonance vibrating system is used one of the masses, the truck body is elastically supported by a strong spring over another mass, the chassis, and a periodic exciting force is given by a crank mechanism which is provided between the truck body and the chassis, and the system is operated at a resonance condition. In this case while the chassis will also vibrate as a reaction to the movement of the truck body as the chassis is elastically supported by traveling tires and suspension springs, the vibration of the truck body only is effectively used for transfer of loaded material.

Embodiments of the invention shall be described in detail referring to the attached drawings.

FIG. 1 is a side elevation of an example of the goods transfer device of the present invention and is provided on an ordinary truck (motor wagon) solely for unloading purpose, showing the condition of the unloading operation of such bulk material as sand and gravel.

FIG. 2 and FIG. 3 are detailed side elevations showing the relationship between the truck body and the chassis in respectively, the condition, where unloading is being done by the truck with said device and the condition where the truck is traveling on a road with the device held in a nonoperative condition, showing such arrangements as the way the truck body is supported over the chassis by spring, guide spring, vibratory mechanism (exciter), and lock device to lock the truck body to the chassis.

FIG. 18 is an enlarged view of a truck body and a chassis.

FIG. 19 is a cross-sectional view taken along the line A–A–A in FIG. 18.

1. The case when truck body only is subjected to vibration

Figure 4:
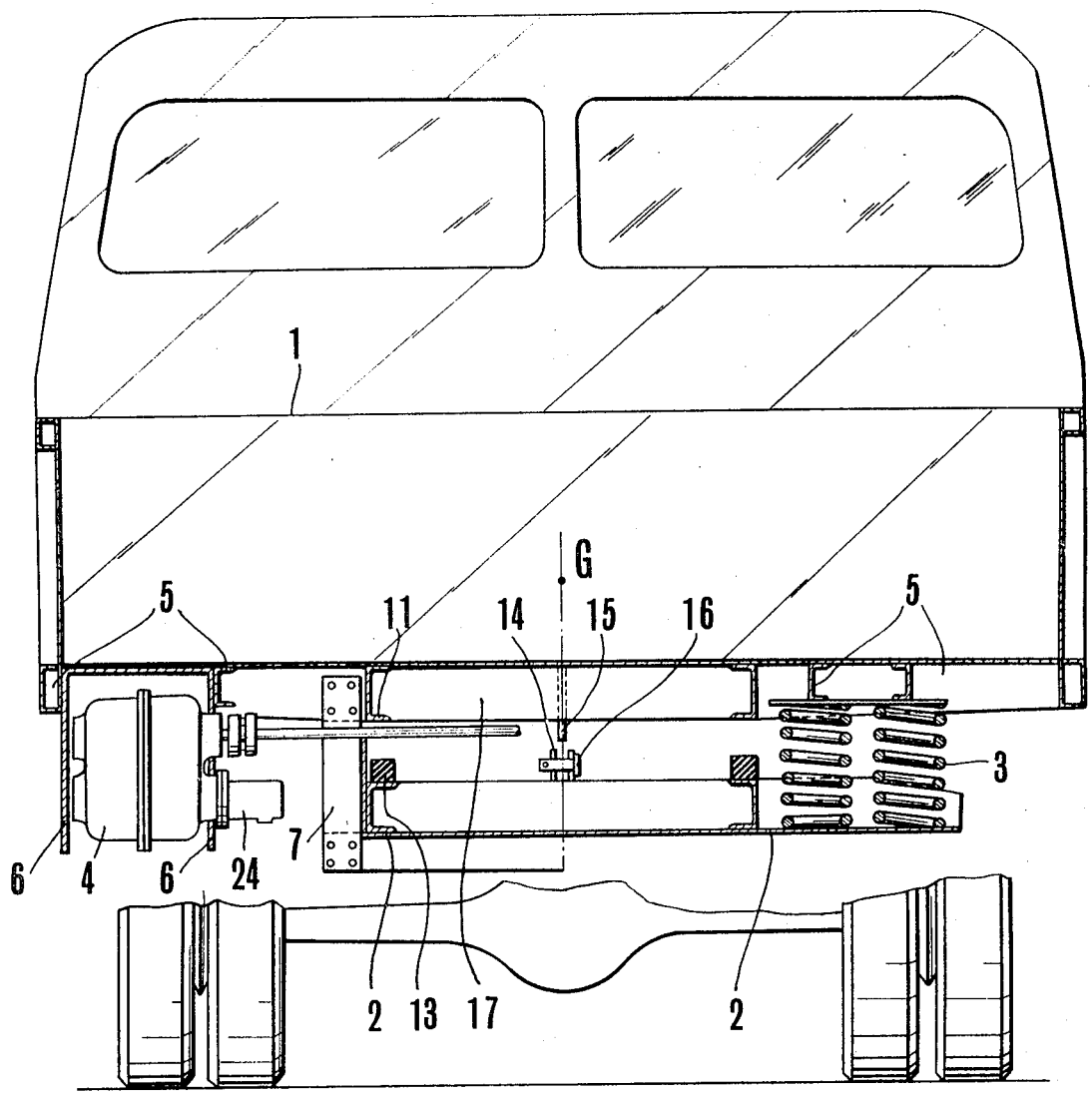
FIG. 4 is a cross-sectional view of entire truck with said device placed in an operative condition, wherein the portion left of the center line shows the arrangement of chassis, exciter and guide spring, and the right half shows the way the truck body is supported on the chassis by springs.

FIG. 1 shows an example using an unbalanced weight vibrating system which is further illustrated in FIG. 2, FIG. 3 and FIG. 4 showing its details, wherein 1 is a truck body, G is its center of gravity position (while the position varies between the case when the truck body is empty and the case when it is loaded, the mean position is shown here), 2 is the chassis of the truck, 3 is a coil-spring supporting the truck body 1 over the chassis 2, 4 is an exciter to generate straight line motion assembled to both sides of an underframe 5 of the truck body 1 and is so positioned that line A—A, which represents the direction of the exciting force generated by the exciter, passes near G and forms angle α with the horizontal plane. A skirt shaped reinforcing member 6 is so constructed that the exciting force is smoothly transmitted to the underframe 5 in a wide range. What are shown as 7 are leaf shaped guide springs so suitably arranged as to prevent lateral movement of truck body 1 and to have the truck body to make parallel motion with the chassis 2 in the direction of line A—A, and to interconnect them. All of said figures except FIG. 3 show the condition of this device in operation. In this case, truck body 1 makes, over the coil spring 3, proximate straight line motions with a project angle α, a total amplitude 2a and frequency n of the exciter 4, that is, with frequency n, as indicated by arrow marks over the both ends of the truck body 1 in FIG. 1. By doing so, the loaded cargo, for example, sand and gravel in the truck body 1, is shifted by vibration towards the back door 8 as shown in the drawing. At this time the sand and gravel is made to be continuously shifted in a uniform thickness, overspreading to the entire width of the truck body 1, then it is discharged out of the back door 8. In this case it is desirous that said operation is done when the truck is parked in as horizontal a position as possible.

Next, explanations shall be made about the case when the unloading operation is finished with this device and the truck travels on a road. If the truck body 1 is in the same condition as in unloading operations shown in FIG. 1, FIG. 2 and FIG. 4, that is, the truck body 1 is freely supported with the coil spring 3 over the chassis 2 while the truck is traveling, the truck body will freely move by the vibrational movement of truck in travel causing very unsafe condition.

Therefore, to prevent such hazard, a lock device is provided at each end, front and rear, of the truck body 1. Before the truck starts traveling, a jack 9 fixed to the chassis 2 is activated so that the jack and links 10 connected therewith pull the truck body 1 towards the chassis 2 suppressing the coil spring 3, causing a main beam 11 of the underframe 5 to be pressed against cushion member (contacting member) 13 which is made of such material as wood or rubber and is fixed on the chassis 2 with bolts 12, having pin openings of the bracket 14 and lever 15 of fork shape, which are extended out of the truck body 1 and out of the chassis 2 respectively, overlap each other, and fixing them together with pin 16. This is called as lock device. While FIG. 3 shows what is provided at the front end of the truck body a, similar device is provided also at the rear end. When such lock device is activated, the weight of the truck body 1 bears onto the chassis 2 through the main beam 11 of the underframe which is resting on the contacting surface of the cushion member 13. Thus the weight of the truck body can be suitably distributed in proportion to the strength of the chassis 2, by properly arranging the cushioning member over the chassis 2.

In FIG. 3, apostrophe mark (') is added to each part number such as the truck body 1', coil spring 3', and leaf shaped guide spring 7' to represent the state when the lock device is working, distinguishing the same from the state when the goods transfer device is working.

It is desirous to activate the jacks 9 for front and rear lock device simultaneously using hydraulic motor, etc.

In FIG. 4, coil springs 3, exciters 4, and leaf shaped guide springs 7 are arranged so that equal numbers of each kind of such parts are positioned left and right at symmetric position to the center line of the truck body 1 (or may be considered as the chassis 2). The left and right exciters 4 are interconnected with a common shaft 17 in such manner that their phase of exciting force are completely in accordance with each other.

Figure 5:
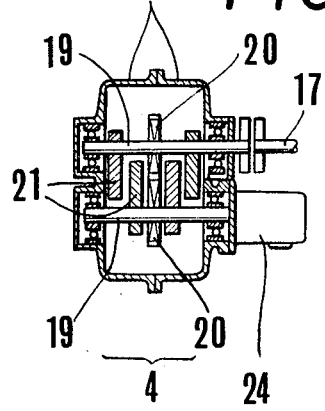
FIG. 5 is a cross-sectional view showing an outline of structure of an exciter by itself.
Figure 6:
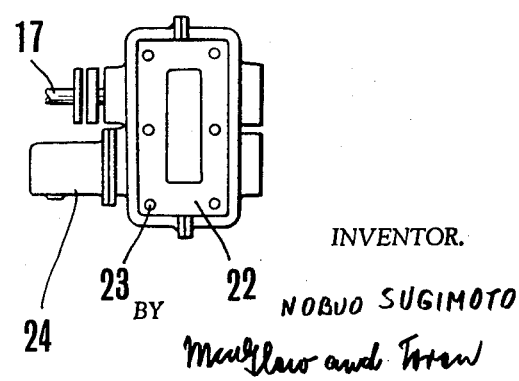
FIG. 6 is a rear view of the exciter, showing its mounting flange.

Details of unit exciter 4 are shown in FIG. 5 and FIG. 6, which employ vibrating screen to effect straight line motion, that is conventionally known mechanism used in so-called low head vibrating screen. While such mechanism needs not be explained, in the exciter, two rotating shafts 19 are positioned in parallel within a casing 18 which is divided into two parts, and are rotated in such directions as being opposite to each other by a pair of gears 20 which engage with each other at the centers of said shafts with a gear ratio of 1 : 1. Unbalanced weights 21 of equal dimension and weight are provided on each rotating shaft, being symmetrically positioned. And the exciter 4 is firmly fixed by flange 22 and mounting bolts 23 to the above-mentioned skirt shaped reinforcing member 6 so that its exciting force can be uniformly transmitted to the entire truck body.

Now, the exciter 4 is driven by an oil motor 24, which does not have to be provided at two places symmetrically arranged, but only one of such oil motor provided at one side will be sufficient. Its oil power is supplied by a hydraulic pump driven by the main engine of this truck, and the exciter 4 is driven by such means of transmission of driving force with oil pressure as are publicly known. In this case the number of revolutions of the oil motor 24 directly becomes the frequency of the exciter 4, and can be adjusted by an accelerator which controls the revolution number of the main engine, or by a flow control valve provided in hydraulic channel. By thus changing the frequency the traveling speed of the loaded goods shifted by vibration will vary accordingly, thus the time required for unloading goods can be controlled. (That is, when it is desired to unload cargo quickly the frequency should be increased.)

What has been explained above is the basic structure of the case when the truck body only is subjected to vibration, but the structure will not be limited to the example shown in the drawing and there will be a number of variations possible in the structure and arrangement of the exciters themselves, the way the truck body is supported by coil spring, structure and arrangement of the guide spring to prevent lateral movement of truck body, locking mechanism and method of driving the exciters, etc. In short it is the fundamental principle of the present invention to support the truck body by spring over the chassis and assemble exciters thereto for generating straight line movement.

Figure 7:
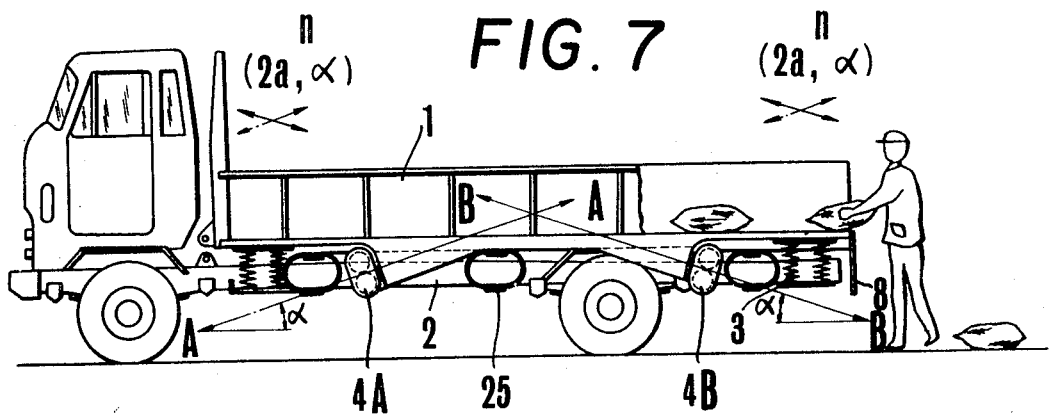
FIG. 7 is a side elevations of an example wherein the goods transfer device of the present invention is provided on an ordinary truck for such purpose as using the device for loading goods as well as unloading the same, showing the condition wherein such piece material (goods) as bags are being loaded.
Figures 8, 9:
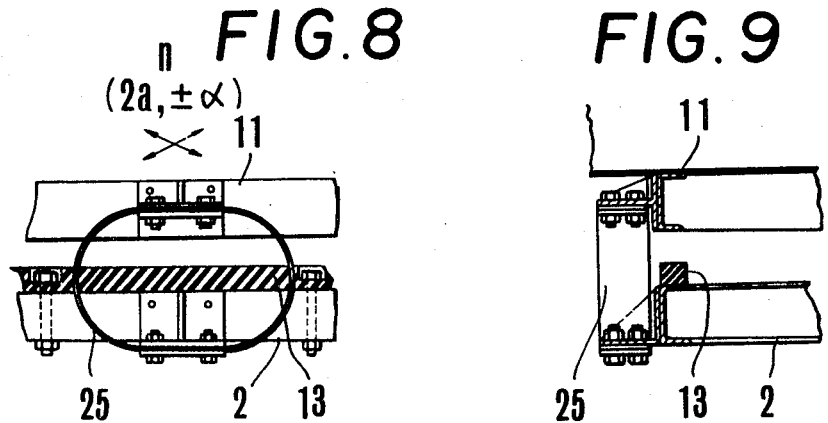
FIG. 8 and FIG. 9 are a side elevation and a rear elevation respectively, showing in an enlarged manner the detailed structure of the guide spring, featuring the relation between the truck body and chassis of the truck when it is in the condition shown in FIG. 7.
Figure 10:
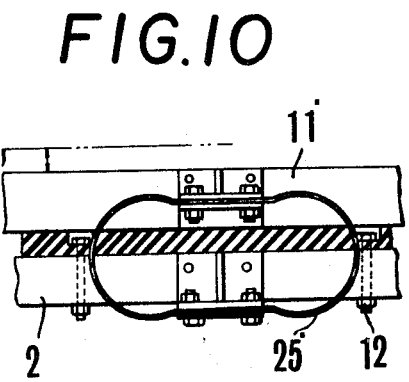
FIG. 10 is a side elevation of the same part in a condition wherein the truck is running on a road with the goods transfer device held in a nonoperative status.

Next, explanations will be made for an example of a truck in which said device is used for both unloading and loading purposes. As being apparent in FIG. 7, 4A is an exciter for unloading, 4B is an exciter for loading provided at the rear of the truck body, and the both exciters are of almost same structure and dimensions. And the exciter 4B is so arranged that its exciting force is directed to the line B—B which forms an angle $\alpha$ with the horizontal plane and passes G point. The main difference from the case for unloading only is the leaf shaped guide spring, which in this case employs a leaf spring 25 the section of which forms an oblong shape as shown in FIG. 8 and FIG. 10 so that it can serve both for the direction of line A—A and the direction of line B—B, for preventing lateral movement of the truck body 1. Other than this, the coil spring to support the truck body 1 over the chassis 2 can be completely same as the one used in former case, and the locking mechanism does not have to have substantial difference.

Thus, the exciter 4A only is used in unloading and the exciter 4B only is used in loading.

2. The case when entire vehicle is subjected to vibration

Figure 11:
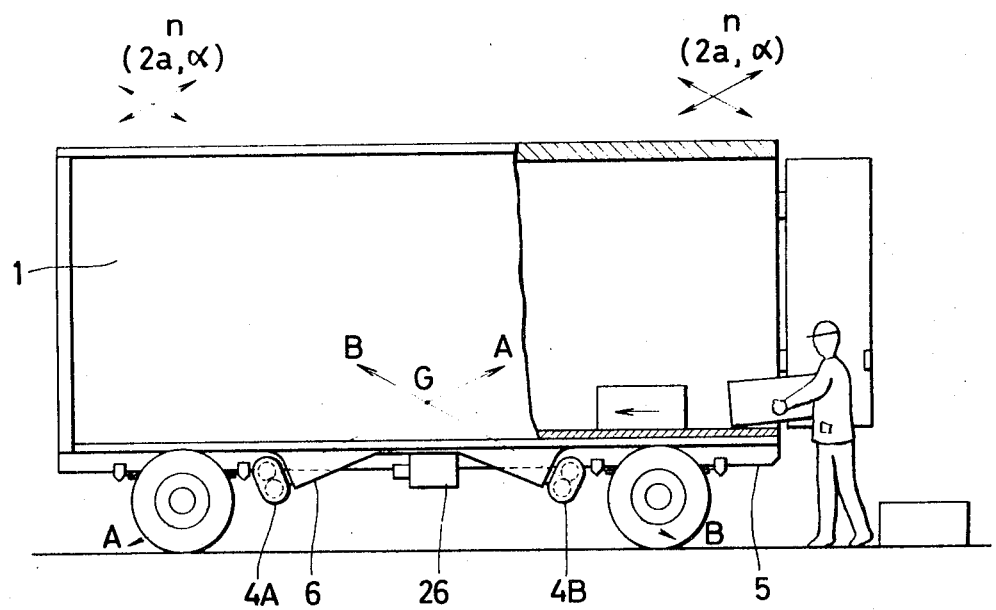
FIG. 11 is a side elevation of an example of a covered wagon trailer wherein the goods transfer device of the present invention is provided for both unloading and loading use.

In the example of the four-wheeled trailer shown in FIG. 11, the entire vehicle is positioned over an underframe 5, and there is nothing equivalent to the chassis in a truck. When the entire vehicle is subjected to a prescribed vibration in the direction of an arrow A—A and in the direction of an arrow B—B over suspension springs containing traveling tires, the arrangement serviceable both for unloading and loading can be obtained. For that purpose, exciters 4A and 4B for unloading and loading respectively can be directly assembled to the underframe 5 of the body 1 in the manner shown in FIG. 1 and FIG. 7. In this case, naturally the coil spring, guide spring and locking mechanism, which are essential in FIG. 1 and FIG. 7, are not necessary. On the other hand it is necessary to provide an auxiliary engine 26 to drive oil pump as the trailer does not have a main engine. In performing unloading or loading operations it will be practical to release the connection with a tractor-engine and to check the four traveling tires with wedge shape blocks.

In the event the trailer is a two-wheeled semitrailer, when a tire of small diameter is provided at the front point of the stand (outrigger) attached to the front end of the trailer, it can be used in the same manner as in a four-wheeled trailer.

Now, the examples of this invention shown in the drawings and in this specification are solely for explanation purpose, and while there are many publicly known kinds of exciters, such exciters as being combined with electric motors or a single exciter which can have its direction of vibration changed by a handle, etc., may also be used. As to the spring to support the truck body, not only metal spring but also pneumatic spring can be used. In this case the height of the spring is adjusted by charging and discharging of air and the spring can be so advantageously used as being suitable for the given operating condition and traveling condition.

While every one of the examples explained above is for an unbalanced weight vibrating system, examples of resonance vibrating system shall be explained next.

Figure 12:
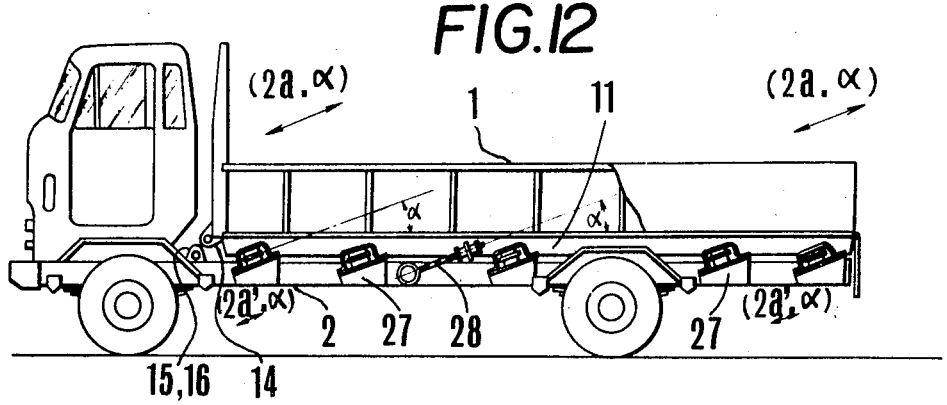
FIG. 12 shows an example of a truck in which the device is used solely for unloading and is of such vibration generating system as being different from that shown in FIG. 1 and FIG. 7, that is, a resonance system.

FIG. 12 shows a truck in which this system is used solely for unloading, wherein a truck body 1 is supported over a chassis 2 with a strong elasticity by a number of elastic mountings 27 (five of them are seen in the drawing), and a crank mechanism 28 is provided between the truck body 1 and the chassis 2. Details of these parts are shown in FIG. 13.

Figure 14:
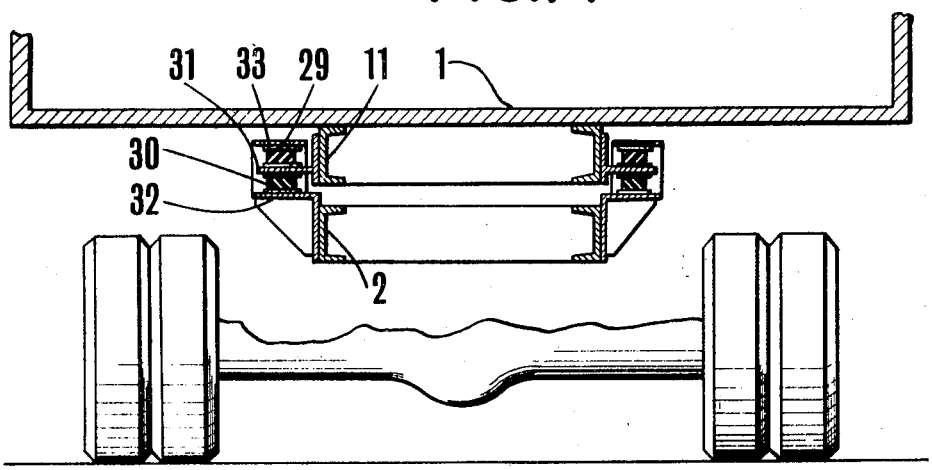
FIG. 14 and FIG. 15 are cross-sectional views of the body of the truck.

Each of the elastic mountings 27 has, as will be realized by referring to the cross-sectional view of FIG. 14, a spring action by two rubber blocks 30 of rectangular parallelepiped shape bonded to a metal plate 29 at their both sides. The rubber blocks 30 are assembled to upper and lower portions of bracket 31 which is rigidly projecting out of main beam 11 of the truck body 1 and is holding an angle $\alpha$ between horizontal plane and itself. The other metal surface of the rubber block 30 is assembled as shown in the drawing by bracket 32 which is fixed to chassis 2, forming an angle $\alpha$ with horizontal plane and by fixing metal 33.

The elastic mounting 27 is so made that the bracket 31 can be shifted while it forms an angle $\alpha$ against chassis 2, and the shearing force of two rubber blocks 30 is utilized for its spring action. Such elastic mounting 27 is arranged in a large number symmetrically to both sides of longitudinal center line of the body of vehicle, thus the truck body 1 is supported over the chassis 2 with strong elasticity.

Figure 13:
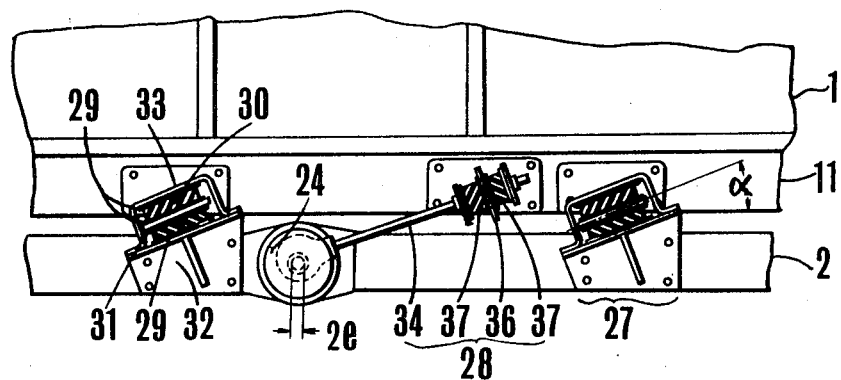
FIG. 13 is an enlarged view of said system showing the relation between the truck body and the chassis.
Figure 15:
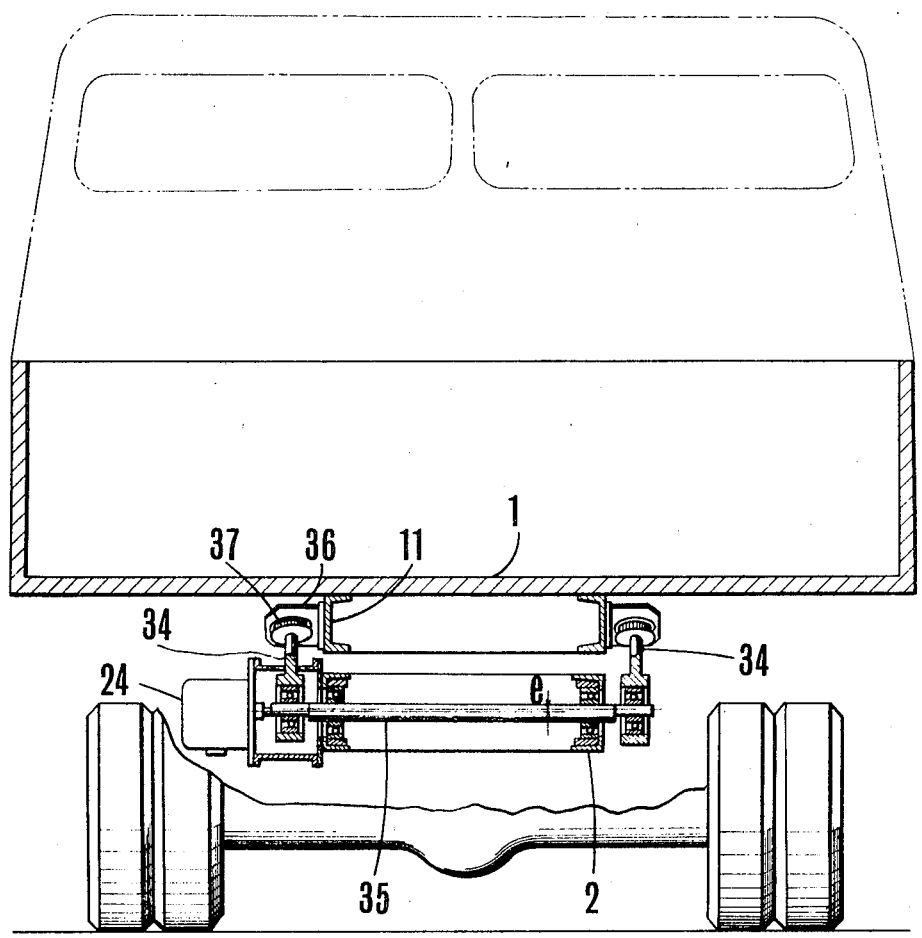
Figure 16:
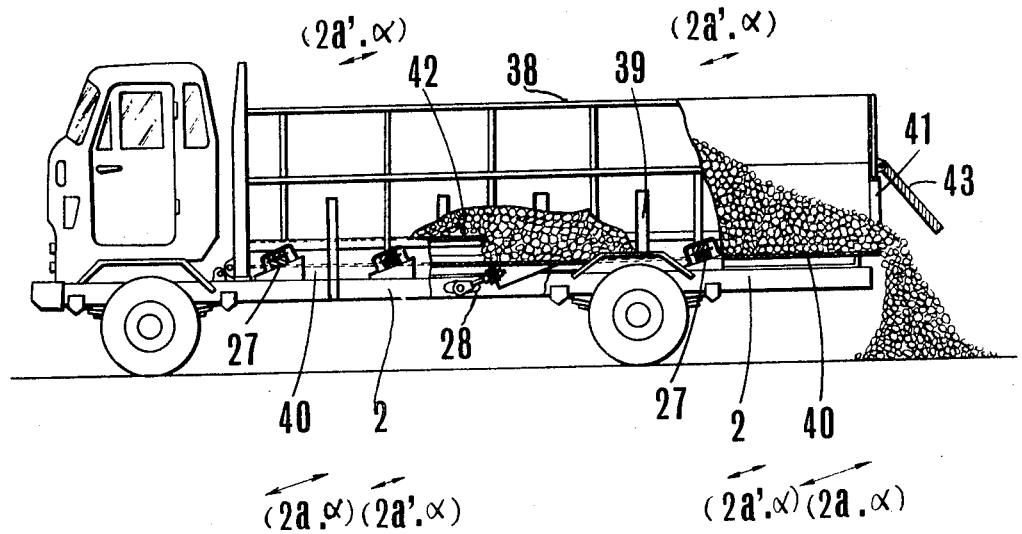
FIG. 16 is a side elevation of said truck.
Figure 17:
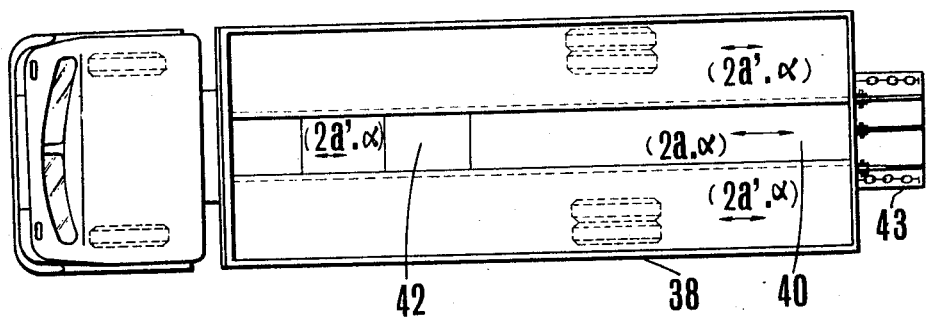
FIG. 17 is a plan of the truck as viewed from above.

On the other hand, concerning crank mechanism 28, as shown in the cross-sectional views of FIG. 13 and FIG. 15, two left and right driving rods 34 are so arranged that they form an angle $\alpha$ with horizontal plane and that they are placed at symmetrical position on both sides of the longitudinal center line of the chassis 2. Thus the crank mechanism is driven with a crank radius of $e$ by crank shaft 35 assembled through the chassis 2. The other ends of the driving rods 34 are connected to the truck body 1 with strong elasticity through two rubber blocks 37 which are provided in such manner that two blocks hold therebetween both sides of bracket 36 rigidly projecting out of the main beam 11 of the truck body 1, thus driving force is transmitted. Said crank shaft 35 is driven by an oil-motor 24 as explained in the foregoing examples.

By arranging the parts in such structure as mentioned above, the two masses of the truck body 1 and the chassis 2 (including engine and cab which are supported by tires and suspension springs) form one vibrating system with a spring action of the elastic mounting 27. Therefore, when the crank mechanism 28 is driven with such number of rotations as being close to the resonance frequency of said vibrating system, the truck body 1 and the chassis 2 vibrate in such direction as forming an angle $\alpha$ with the horizontal plane and as being opposite to each other. That is, when the truck body 1 moves towards upper right hand direction at one moment, the chassis 2 moves, as a reaction, towards lower left hand direction within a same line of movement, over traveling tires and suspension springs. In this case the ratio of the amplitude of the truck body 1 and that of the chassis 2 is inversely proportional to mass of each said part, and the sum of the amplitude of the both parts are about twice as big as radius $e$ of the crank.

The fact that the truck body 1 is supported over the chassis 2 with a strong elasticity is a significant special feature of resonance vibrating system, and the reason for so arranging it is to make the resonance frequency of the vibrating system, that is, actual operating frequency as great as possible. In this case, since the weight of the truck body 1 is uniformly transmitted to the chassis 2 through each elastic mounting 27, the jack 9 and cushion member 13 which are necessary in the case of unbalanced weight vibrating system shown in FIG. 1 or FIG. 7 may be omitted.

Now this example is for such system that when the truck body 1 is made to vibrate, the chassis 2 also vibrates with same frequency as a reaction, therefore, since the amplitude of the truck body 1 and that of the chassis 2 are inversely proportional to the weight of each of said parts, if the weight of the truck body 1 (sum of the dead weight of the truck body 1 and weight of loaded cargo) is greater than weight of the chassis 2 (sum of weights of chassis, engine and cab), the chassis 2 vibrates with such amplitude as being greater than that of the truck body 1. Therefore, if it is intended to provide prescribed amplitude to the truck body 1, the chassis 2 will resultantly have such amplitude as being greater than that, causing difficulties arising therefrom, thus it is undesirous.

Therefore, the system in this example can be used only when the sum of dead weight of the truck body 1 and weight of loaded material is not so bigger than weight of the chassis 2.

When loaded cargo is either such bulk material as a great quantity of dirt and sand or such piece goods as heavy castings, both of which are deemed to be suitable for unloading by a dump-truck as in a conventional case, a truck with said system will not be suitable. However, a truck with such structure as will be described below wherein the vibratory principle in the above case is applied, can be satisfactorily used in place of a conventional dump truck.

Now, the structure will be explained below.

In FIG. 16 through FIG. 19, the truck body of said truck is, as shown in the drawing, of such shape as if a stand is placed upside down with its bottom entirely opened, that is, being formed as a hopper 38 having no bottom plate, and is fixed on the chassis 2 by a bracket 39. And a U-shaped trough 40 with such width as being wider than the bottom opening of the hopper is positioned directly underneath said opening running in a longitudinal direction of the hopper, in such manner as running along the opening as shown in the drawing, as reaching an opening 41 at a rear wall of the hopper 38.

This trough 40 is elastically supported over the chassis 2 by a number of elastic mountings 27 in such manner that it can make a straight line movement to such direction as forming an angle $\alpha$ with the horizontal plane with its rear portion up. The manner in which the trough 40 is supported as mentioned above is just same as the manner in which the main beam 11 of the truck body 1 is elastically supported over the chassis 2 in FIG. 12, FIG. 13, FIG. 14 and the main beam 11 corresponds to the trough 40 in this example. As to the elastic mounting 27, since it will have completely identical structure as in the example just explained above, explanation will be omitted. Such crank mechanism 28 as shown in FIG. 13 and FIG. 14 is provided between the trough 40 and the chassis 2.

In a vibrating system with said set up the chassis 2 which is supported by traveling tires and suspension springs and the hopper 38 are integrated against one mass of the trough 40, the consolidated mass of the former two parts confronts with the mass of the other (trough), and the vibrating system consists of said two masses confronting with each other and strong elasticity provided by a number of elastic mountings which connect said two masses.

When the crank mechanism 28 is driven by the rotating force of an oil motor 24 with such number of rotations as being close to the resonance frequency of this vibrating system, the trough 40 makes a straight line movement confronting with the hopper 38 and the chassis 2, and as the mass of the trough 40 is far smaller than the combined mass of the hopper 38 and the chassis 2, the trough 40 vibrates with greater amplitude ($2a$), while the hopper 38 and the chassis 2 vibrate with smaller amplitude ($2a'$).

Now, in this case the weight of loaded material will be partly borne by the trough 40 and the balance by the hopper 38. And the ratio of said weight borne by the trough and the hopper can be adjusted by adding or reducing the number of closing plates 42 which are divided into several pieces and are provided at bottom opening of the hopper. (That is, when the number of the closing plates 42 is increased to close greater portion of the opening the weight of loaded material will be more and more borne by the hopper 38, while when the closing plates are taken away the weight will be more and more borne by the trough 40).

If most portion of the opening is closed using a large number of the closing plates 42, majority of weight of loaded material will be borne by the hopper 38, increasing the mass of the hopper, and as a result the amplitude $2a'$ of the hopper 38 becomes further smaller, while the amplitude $2a$ of the trough becomes greater. Therefore, even if the hopper 38 is fully loaded with cargo, the capacity of the trough 40 to transfer cargo by vibration will tend to be increased.

In this structure, since the amplitude of the trough 40 is larger than the amplitude of the hopper 38 and chassis 2 at any time, it is easy to give a prescribed amplitude ($2a$) to the trough. Thus, while material directly placed on the trough 40 is transferred by vibration and is discharged successively from a tail-gate 43, the hopper 38 will also vibrate as a reaction of the vibration of the trough 40, therefore the material within the hopper 38 will gradually collapse, as the portion of material at the bottom is discharged, and slide down on the sloped inside wall of the hopper 38, thus finally all material will come onto the trough 40, thereby the material loaded in the hopper 38 can be all taken out of the hopper by the trough 40.

Now, since the trough 40 and the hopper 38 make relative movement, certain clearance will be required therebetween by any means, and it will be necessary to prevent loaded material from dropping out through this clearance while the truck is traveling. For this purpose, a curtain 44 made of such flexible material as rubber or canvas cloth may be so fixed to the hopper that said curtain will be hung to seal the clearance between the lower edge of the hopper 38 and the trough 40.

The sealing of the portion between the opening 41 at rear wall and end part of the trough 40 will be made tightly by having such flexible material 45 as rubber, which is bonded to inside of tail-gate 44, closely adhere to said portion.

While what has been described above is the structure competing with a dump truck for bulk material, it is also possible to provide a trough 40 with such structure as mentioned above at a center of a truck body having such flat bottom as in the truck body 1 of FIG. 12 for utilizing the same in transfer of material on the truck body (either for unloading or loading) in a general purpose truck.

What is claimed is:

1. Goods transfer device on a motor wagon or trailer van comprising a chassis including tires and suspension springs for supporting said chassis, a hopper-shaped body fixed to said chassis and having a lower portion of its sides extending downwardly and inwardly to a centrally positioned elongated opening extending in the direction of travel of said chassis, the opening having a width representing a minor fraction of the total width of said hopper, an upwardly facing U-shaped trough positioned directly underneath the opening from said body and extending laterally outwardly from the opening for receiving and retaining any goods passing downwardly through the opening from said hopper-shaped body and for discharging the goods from the rearward end thereof, said trough having a mass which is considerably smaller than the combined mass of said chassis and hopper-shaped body and having a width in the range of ¼ to 1/5 of the width of said hopper, a vibrating system, a plurality of elastic rubber mounting members having one end secured to said chassis and the other end secured to said U-shaped trough and spaced apart thereon in the direction of travel of said chassis and supporting said trough so that due to the elastic support said trough can perform straight line movements in the direction of travel of and relative to said chassis, each of said rubber mounting members comprises a bracket, a pair of rubber blocks each having a similar rectangular parallelepiped form with one superimposed on the other, a flat metal plate on each of an opposite pair of sides of each of the said rubber blocks, said metal plates mounted in said bracket and disposed at an acute angle to the horizontal and sloping upwardly toward the rear of said chassis, a crank mechanism secured to said chassis and connected to said trough, and means for driving said crank mechanism at such a number of rotations close to the resonance frequency of the vibrating system including said trough and said chassis and body so that due to the smaller mass of said trough relative to said chassis and body said trough vibrates with a greater amplitude than said chassis and body for effecting the displacement of goods entering said trough from the opening in said body through said trough in the rearward direction for discharging the goods at the rearward end thereof.

* * * * *